Dec. 3, 1946.    J. R. WOODYARD    2,411,916
MEASURING APPARATUS
Filed June 28, 1943

INVENTOR
JOHN R. WOODYARD
BY
ATTORNEY

Patented Dec. 3, 1946

2,411,916

UNITED STATES PATENT OFFICE 2,411,916

MEASURING APPARATUS

John R. Woodyard, Garden City, N. Y., assignor to Sperry Gyroscope Company, Inc., a corporation of New York Application June 28, 1943, Serial No. 492,573

11 Claims. (Cl. 172—245)

1

My invention relates to electrical measuring devices in general, and more particularly to methods and apparatus for determining the phase angle between two alternating or periodically varying quantities.

An object of my invention is to provide a device for measuring the phase difference between two periodically varying quantities in which the restoring force acting on the indicating element thereof is independent of frequency.

Another object of my invention is to provide an electronic phase meter which is less affected by noise or other random fluctuations than are prior electronic phase meters.

It is also an object of my invention to provide a phase meter which utilizes the information of the impressed signal quantities over whole cycle periods.

Another purpose of my invention is to provide a method and apparatus for determining the phase angle between two alternating electrical quantities in which a product of the two is divided by another product, obtained by multiplying the two quantities after rectification, to give a measurement of phase difference.

Another purpose of my invention is to provide a phase meter in which no moving parts carry the quantities whose phase difference is to be measured.

A still further object of my invention is to arrange in an electronic phase-measuring circuit two balanced modulators, which produce direct current outputs respectively proportional to a function of the phase angle between the two quantities whose phase difference is to be determined and to their product, and a device such as a crossed-coil ohmmeter which is capable of taking the quotient of the two direct currents so produced, to give an indication of the phase angle.

Yet another purpose of my invention is to provide a method for determining the phase angle between two periodically varying electrical quantities in which two direct currents are produced therefrom by modulation and rectification, which are proportional to a function of the phase angle between the quantities and to their products, the quotient of the direct current quantities being taken to give an indication of phase angle measurement.

Other objects of my invention will become apparent and those listed more evident as the description proceeds.

In practising my invention, in a preferred embodiment thereof, I provide a circuit having two pairs of input terminals, each of which receives one of the two alternating quantities whose phase angle difference is to be measured. From these input terminals the electrical quantities are delivered to the signal and carrier input terminals of a balanced modulator where one of the alternating quantities is modulated with the other to produce a direct current proportional to a function of the phase angle between them.

The alternating quantities are rectified in another branch of the circuit by means of full-wave rectifiers and impressed on the signal and carrier terminals of a second balanced modulator, the output of which is proportional to the product of the two periodically varying quantities. The outputs of each of the balanced modulators are then delivered to a quotient-taking device where the quotient of the two modulated outputs is taken to give an indication of the phase angle to be determined.

A more comprehensive understanding of my invention will be afforded from the following detailed description when taken together with the accompanying drawing in which, Fig. 1 is a circuit diagram of an embodiment of my invention;

Figure 2:
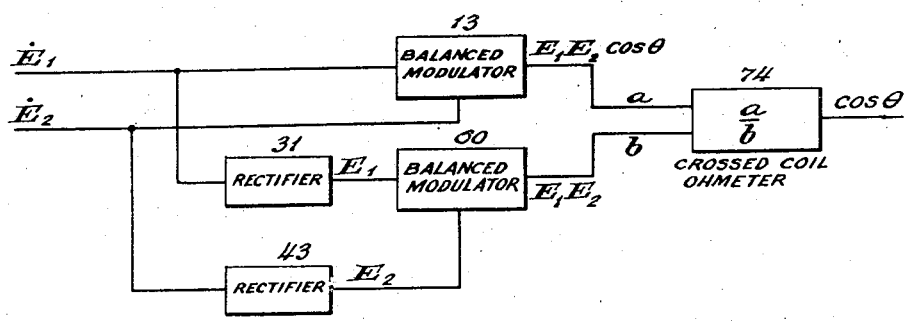
Fig. 2 is a modified block diagram of the circuit shown in Fig. 1.

As indicated schematically in Fig. 2, the illustrated apparatus comprises a pair of balanced modulators 13 and 60, each of which is made responsive to both of the vector voltages $\dot{E}_1$ and $\dot{E}_2$, which are to be compared in phase. The modulator 13 is directly connected to the voltage inputs $\dot{E}_1$ and $\dot{E}_2$ so as to yield an output proportional to the vector product of the input voltages, which includes the phase angle factor, $\cos \theta$. On the other hand, the balanced modulator 60 has rectifiers 31 and 43, respectively, interposed in the input connections from the voltages $\dot{E}_1$ and $\dot{E}_2$ so that phase-effect is eliminated and D.-C. voltages representing scalar values $E_1$ and $E_2$ are supplied to the balanced modulator 60 rendering it responsive to the scalar product of the voltages. The ratio instrument 74 is provided, which has input connections from the output of the elements 13 and 60 for producing a phase angle indication.

Figure 1:
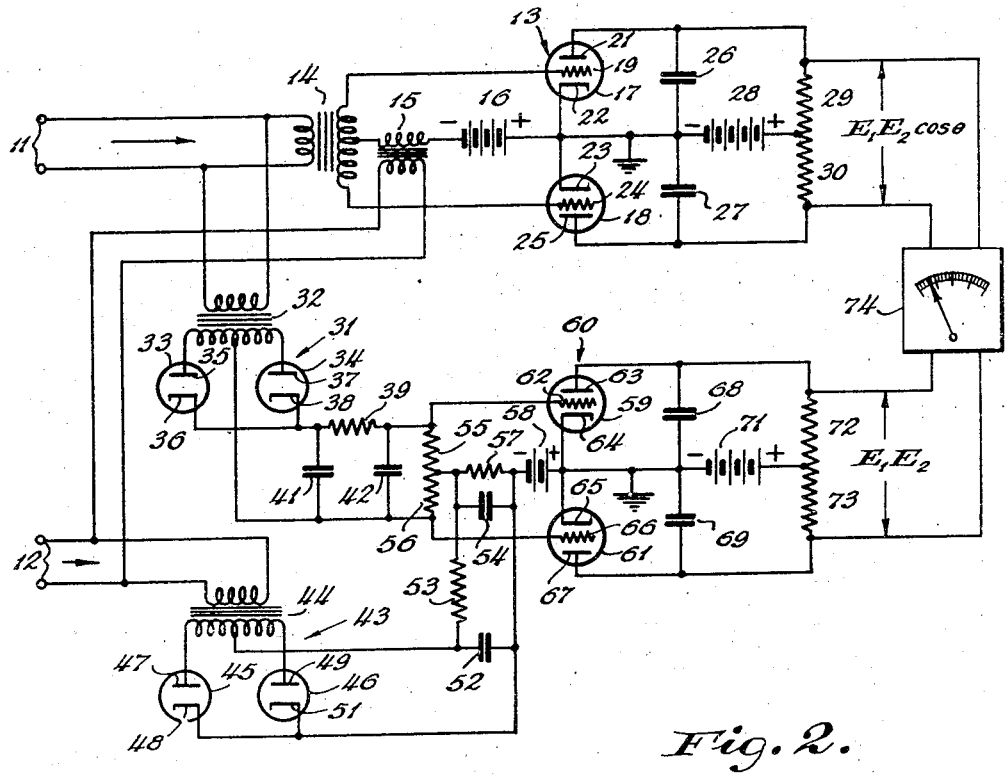

In the embodiment of my invention illustrated more in detail in Fig. 1, I provide two pairs of input terminals 11 and 12 which receive the alternating quantities whose phase angles are to be compared.

From input terminals 11, the quantity impressed thereon is conducted to transformer 14 whose tapped secondary forms the balanced circuit of balanced modulator 13, comprising the electronic discharge devices 17 and 18, illustrated as triodes.

Transformer 15, the secondary of which is coupled in the cathode circuit of balanced modulator 13, receives the electrical quantity impressed upon input terminals 12. Control grids 19 and 24 of elements 17 and 18 receive signal voltages from the secondary winding of transformer 14 which are used to modulate the output of transformer 15. The secondary of this transformer 15 is in series with energy source 16 and together these elements form a circuit for connecting cathodes 22 and 23 of elements 17 and 18 to the mid-point of the secondary winding of transformer 14.

Plates 21 and 25 of these elements deliver the output of balanced modulator 13 to resistors 29 and 30 and receive positive voltage from source 28. By-pass capacitors 26 and 27 are coupled in parallel with elements 17 and 18, respectively, for by-passing the alternating components of their respective outputs.

The signal received on input terminals 11 is also delivered to the primary winding of transformer 32 which, together with the electronic discharge elements 33 and 34, comprises the full-wave rectifier 31. Anodes 35 and 37 of elements 33 and 34, both of which are illustrated as diodes, receive the output of the secondary winding of transformer 32 and their cathodes 36 and 38 deliver the output of the rectifier to a filtering circuit comprising a resistor 39 and capacitors 41 and 42. The output of full-wave rectifier 31 is delivered to the signal input terminals of balanced modulator 60, which in turn delivers it to the control grids 62 and 66 of elements 59 and 61, comprising a part of balanced modulator 60.

The electrical quantity received on the input terminals 12 passes through the primary winding of transformer 44 and is induced in the secondary winding thereof for delivery to anodes 47 and 49 of elements 45 and 46 in the full-wave rectifier 43. The output of this last-mentioned device is taken from cathodes 48 and 51 and delivered to a filtering circuit comprising capacitor 52, resistor 53, and capacitor 54. Through the filtering circuit last mentioned the output of the full-wave rectifier 43 is delivered to the balanced modulator 60 across the resistor 57.

The output of balanced modulator 60, in the form of a direct current proportional to $E_1E_2$ is delivered from plates 63 and 67 of elements 59 and 61 to the resistors 72 and 73. Plate current is supplied the elements of balanced modulator 60 from source 71 and the grids thereof are biased from voltage source 58. By-pass capacitors 68 and 69 are coupled in the output circuit of balanced modulator 60 for by-passing A. C. components.

The direct current outputs of balanced modulators 13 and 60 are delivered to a quotient-taking device 74, which is illustrated as a crossed-coil ohmmeter and which is calibrated to give an indication of the phase angle existing between the two voltages impressed upon input terminals 11 and 12.

While element 74 is illustrated as a crossed-coil ohmmeter it may take the form of any ratiometer or quotient-taking device, such as an Evershed "Megger," or may be of the electronic type in which electronic discharge elements having logarithmic characteristic curves are used.

With reference to Fig. 2, the operation of the circuit may be explained from a functional standpoint in the following manner:

The vector quantity $\dot{E}_1$ representing one of the two alternating quantities, between which the phase angle difference is to be determined, is received by balanced modulator 13 where it modulates the quantity $\dot{E}_2$ to produce a direct current output proportional to the quantity $E_1E_2 \cos \theta$.

Within the rectifiers 31 and 43, each of the respective quantities are rectified to produce scalar quantities $E_1$ and $E_2$ which are delivered to balanced modulator 60 operating as a product-taking circuit. The output of this last-mentioned circuit, proportional to the product $E_1E_2$, and the current proportional to the product $E_1E_2 \cos \theta$, are delivered to a quotient-taking device 74 where division of the two quantities is made to give an indication of $\theta$.

In operation, the balanced modulators 13 and 60 and the full-wave rectifiers 31 and 43 function normally and, accordingly, a detailed explanation of their operation will not be made. A theoretical analysis of the operation of the balanced modulator, with modulator 13 taken as an example, will be presented to explain the theory of the invention.

Figure 3:
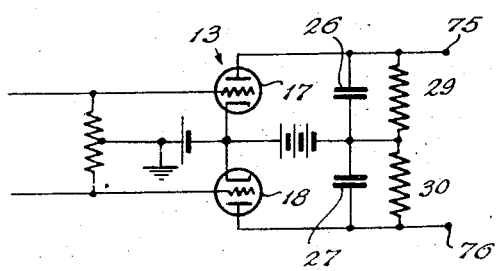
Fig. 3 is a schematic diagram showing the operation of the balanced modulators used in Fig. 1.

Referring to Fig. 3 and using the series expansion for electrode currents, the plate current $i_1$ of tube 17 may be expressed as (1) $i_1 = a_1(e_a+e_b) + a_2(e_a+e_b)^2 + a_3(e_a+e_b)^3 + \ldots$ and the plate current $i_2$ of tube 18 as (2) $i_2 = a_1(e_a-e_b) + a_2(e_a-e_b)^2 + a_3(e_a-e_b)^3 + \ldots$ where the $a$'s are constants, the value of each depending upon tube characteristics and external circuits, and $e_a$ and $e_b$ are the instantaneous values of signal and carrier voltages respectively, whose values may be expressed as (3) $\qquad e_a = E_1 \sin \omega t$ and (4) $\qquad e_b = E_2 \sin (\omega t - \theta)$ where $\theta$ is the phase angle between $E_1$ and $E_2$.

The resultant current $i_0$ delivered to terminals 75 and 76 is therefore equal to the algebraic sum of the currents $i_1$ and $i_2$ or (5) $\qquad i_0 = i_1 - i_2$ which in terms of Equations 1 and 2 may be expressed as (6) $i_0 = 2[a_1 e_b + 2a_2 e_a e_b + a_3(3e_a^2 e_b + e_b^3) + \ldots]$ By choosing the proper operating voltages for the tubes 17 and 18, all components higher than the second order will be made negligible and (7) $\qquad i_0 = 2[a_1 e_b + 2a_2 e_a e_b]$ or (8) $\qquad i_0 = 2a_1 e_b[1 + 2A e_a]$ where $$A = \frac{a_2}{a_1}$$

Substituting the values of $e_a$ and $e_b$, expressed by Equations 3 and 4, in Equation 8 and collecting terms (9) $i_0 = 2a_1 E_1 \sin \omega t + 2a_1 A E_1 E_2 [\cos \theta - \cos 2(\omega t - \theta)]$ Since the alternating current components of the output current $i_0$ of balanced modulator 13 are by-passed by capacitors 26 and 27, the direct current $i_{0dc}$ delivered to terminals 75 and 76, as defined by the second term of Equation 9, is

(10) $\qquad i_{0dc} = 2a_2 E_1 E_2 \cos \theta$ and is proportional to $E_1 E_2 \cos \theta$.

By similar analysis as evidenced by Equation 9 developed above, it is seen that the output $i_{0dc}$ of balanced modulator 60 is proportional to the product $E_1 E_2$, and when combined by suitable means with the output of balanced modulator 13, expressed by Equation 10, a quantity proportional to cos θ is obtained and through proper calibration may be indicated as the angle θ.

Modifications in my invention are, of course, possible and may suggest themselves in view of the foregoing disclosures. Accordingly, the spirit and scope of my invention is to be limited only by the appended claims.

What is claimed is:

1. Apparatus for determining the phase relationship between two periodically varying electrical quantities, comprising means for modulating one of said quantities with the other, means for rectifying each of said periodically varying quantities, means for modulating said rectified electrical quantities one with the other, and means for receiving the outputs of the respective modulating means to give an indication of phase.

2. In an electronic phase meter, a first balanced modulator for modulating one of two periodically varying electrical quantities with the other, separate rectifiers for rectifying each of said periodically varying quantities, a second balanced modulator for modulating the output of one of said rectifiers with the output of the other, and means for determining the quotient of the outputs of said first and second modulators to give an indication of phase angle.

3. In an electronic phase meter a circuit having two pairs of input terminals each of which receive one of two periodically varying electrical quantities, a balanced modulator for modulating one of said quantities with the other, first and second full-wave rectifying devices for rectifying each of said periodically varying electrical quantities, a balanced modulator for modulating the output of said first full-wave rectifier with the output of said second full-wave rectifier, and means including a crossed-coil ratiometer for receiving the outputs of said balanced modulators to give an indication of the phase angle between the two quantities impressed on the input terminals of the circuit.

4. Apparatus for measuring the phase relationship between two periodically varying electrical quantities, comprising means for taking the product of said periodically varying electrical quantities, means for rectifying each of said periodically varying electrical quantities to produc a plurality of rectified outputs, means for taking the product of said rectified outputs, and means for dividing one product by the other to measure the phase angle between said periodically varying electrical quantities.

5. An electronic circuit comprising a first balanced modulator having signal and carrier input terminals for respectively receiving first and second periodically varying electrical quantities differing in phase from each other by an angle θ, separate means for rectifying said first and second periodically varying electrical quantities to produce corresponding first and second rectified electrical quantities, a second balanced modulator for modulating said first rectified electrical quantity with said second rectified electrical quantity, and means for dividing the output of said first balanced modulator by that of said second balanced modulator to give an indication of the angle θ.

6. An electronic phase determining device comprising means for receiving two alternating electrical quantities varying in phase with each other by an angle θ, means for producing from said alternating electrical quantities a first direct current proportional to a function of said angle θ, means for producing from said alternating electrical quantities a second direct current proportional to their product, and means for taking the quotient of said first and said second direct currents to give an indication of the value of said angle θ.

7. A method for measuring the phase difference between two alternating electrical quantities, comprising the steps of modulating one of said quantities with the other to produce a product thereof, converting each of said alternating electrical quantities into unidirectional quantities, combining said unidirectional quantities to produce a product thereof, and combining both of said products so produced to give an indication of phase angle.

8. A method of measuring the phase angle between two periodically varying electrical quantities, comprising the steps of multiplying one with the other to obtain a first product, rectifying each of said periodically varying electrical quantities to produce two unidirectional quantities, multiplying one of said unidirectional quantities with the other to produce a second product, combining said first and second products to produce an electrical quantity proportional to the phase angle between the two periodically varying electrical quantities, and measuring said last-mentioned electrical quantity to give an indication of phase angle.

9. A method for determining the difference in phase between two alternating electrical quantities, comprising the steps of modulating one of said quantities with the other to produce a first modulated quantity, rectifying each of said alternating electrical quantities to produce first and second rectified electrical quantities, modulating said first rectified electrical quantity with said second rectified electrical quantity to produce a second modulated quantity, and taking the quotient of said first and second modulated quantities to give an indication of phase angle.

10. A method for determining the phase angle between two periodically varying electrical quantities, comprising the steps of producing a first direct current from said periodically varying electrical quantities proportional to a function of the phase angle between them, producing a second direct current from said periodically varying electrical quantities proportional to their product, and taking the quotient of said first and second direct currents to give an indication of phase angle.

11. A method of measuring the phase relationship between two periodically varying electrical quantities, comprising the steps of modulating one of said periodically varying electrical quantities with the other to produce a first modulated quantity, rectifying each of said periodically varying electrical quantities to produce two non-periodically varying electrical quantities therefrom, modulating one of said non-periodically varying electrical quantities with the other to produce a second modulated quantity, and combining said first and second modulated quantities to give an indication of phase angle.

JOHN R. WOODYARD.